Jan. 27, 1942.　　　R. M. SCHUPBACH　　　2,270,973
COLLAR HOLDER
Filed April 10, 1940
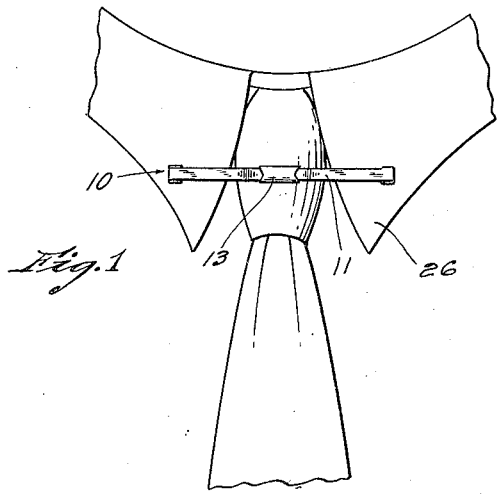
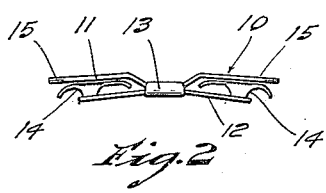
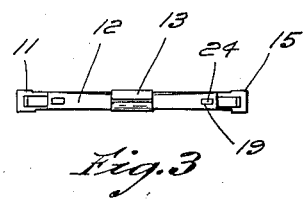
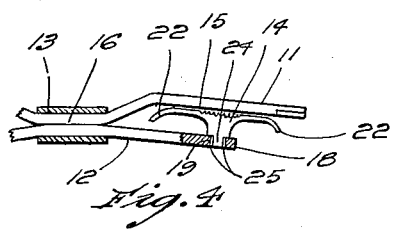
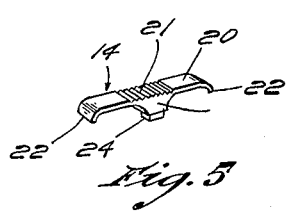
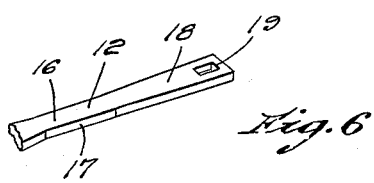
INVENTOR
Rene M. Schupbach
BY
Nathaniel Fuchs
ATTORNEY Patented Jan. 27, 1942

2,270,973

UNITED STATES PATENT OFFICE 2,270,973

COLLAR HOLDER

Rene M. Schupbach, Edgewood, R. I., assignor to Freeman Daughaday Company, Providence, R. I., a corporation of Massachusetts Application April 10, 1940, Serial No. 328,863

2 Claims. (Cl. 24—81)

My present invention relates to the manufacturing jewelry art, and has particular reference to a novel construction for a collar holder.

The principal object of the invention is to provide a collar holder which affords a firm grip on the collar and does not permit slipping.

Another object of the invention is to provide a collar holder which facilitates insertion of edges of the collar and at the same time affords a large gripping surface to prevent wrinkling of the collar.

An additional object of the invention is to provide a collar holder which is made up of a minimum number of readily stamped and quickly assembled parts.

With the above and other objects and advantageous features in view, my invention consists of a novel arrangement of parts more fully disclosed in the detailed description following, in conjunction with the accompanying drawing, and more specifically defined in the appended claims.

In the drawing:

Fig. 1 is a front elevation of my improved collar holder attached to a collar;

Fig. 2 is an enlarged edge view thereof;

Fig. 3 is an enlarged rear elevation;

Fig. 4 is an enlarged detail section, parts being broken away;

Fig. 5 is an enlarged perspective view of the clamping jaw; and

Fig. 6 is an enlarged detail perspective of one end of the rear bar member.

Referring more in detail to the drawing illustrating my invention, the collar holder 10 comprises an ornamented front bar 11 and a rear resilient bar member 12 secured to the front member 11 at the central portion thereof, as by means of a collar 13. Journalled in each end of the rear bar member 12 are clamping jaws 14 positioned between the front and rear bar members.

The front bar member 11 may be of any desired shape or form and ornamentation, and includes two substantially elongated wing portions 15 integrally connected with the central portion 16, the central portion being preferably inset as shown in Fig. 4.

The rear bar member 12 is stamped of flat resilient sheet stock, as shown in Fig. 6, preferably slightly narrower in the center as indicated at 17, and tapering outwardly into two wing portions 18, the outer end of each wing portion having a rectangular journal opening 19. The rear member 12 is clamped at the central portion 17 to the inset or inwardly depressed portion 16 of the front member by means of a conventional clamping member or collar 13 as shown in Fig. 2, but may be secured thereto in any other suitable manner. The proportionate lengths of the front and rear members are preferably designed so that the journal openings 19 are substantially behind the center of the wing portions 15 of the front member 11.

Referring to Fig. 5, the jaw 14 comprises an elongated clamping surface 20 which is preferably serrated in the central portion thereof as indicated by the reference numeral 21. Each end 22 of the surface 20 is bent and the central portion 23 thereof is formed as an integral raised boss terminating in a rectangular journal bearing 24. The journal bearings 24 are adapted to fit into the journal openings 19 and are of sufficient width to conform to the width of the journal openings 19 but are slightly smaller in length so that a small space 25 is provided after mounting, as shown in Fig. 4.

When the collar holder is assembled as shown in Figs. 3 and 4, the clamping jaws 14 preferably extend toward but slightly spaced from the back of the front bar member ends. When the edges 26 of a collar or the like are inserted between the surface 20 of the jaw and the back of the bar member 11, the jaw will rock and shift slightly, due to the provision of the space 25 and the clearance between the jaw and the front bar member. The edges of the collar 26 can thus be slipped between the jaws and the front member. After the collar tabs have been completely inserted in the collar holder, the thickness of the collar tabs presses the jaw away from the front bar member against the tension of the rear bar member 12, and the jaws firmly grip the collar tabs, the serrations 21 additionally resisting slippage. The elongated surface of the jaws 14 prevents any mark or wrinkle on the collar tabs. When resisting normal pulls or tugs on the collar tabs, the clamping jaw 14 tends to rock slightly within the journal opening 19 so that the inner end 22 is forced up to pinch the collar tab. The collar tabs are thus evenly and firmly held between the clamping jaws and the front member, without strain or wrinkling, and the collar holder cannot slip from the collar under the normal tension of wearing. Furthermore, the rectangular shape of the journal opening and of the journal bearing 24 prevents the clamping jaw 14 from turning and keeps it in parallel alignment with the front bar.

While I have described a specific constructional embodiment of my invention, it is obvious that changes in the size, shape, and relative arrangement of the parts may be made to suit different collar holder requirements without departing from the spirit and the scope of the invention as defined in the appended claims.

I claim:

1. In a collar holder, an elongated front member, a rear member of resilient material secured thereto adjacent the center portion thereof, said rear member having a rectangular opening at each end, and a gripping jaw at each end having a flat elongated gripping surface adapted to extend towards the back of the front member and a rectangular bearing stud loosely seated in the contiguous rectangular opening, and held against removal therefrom solely by the resilient thrust of the rear member towards the front member.

2. In a collar holder, an elongated front member, a rear member of resilient material secured thereto adjacent the center portion thereof, said rear member having a non-circular opening at each end, and a gripping jaw at each end having a flat elongated gripping surface adapted to extend towards the back of the front member and a non-circular bearing stud loosely seated in the contiguous non-circular opening, and held against removal therefrom solely by the resilient thrust of the rear member towards the front member.

RENE M. SCHUPBACH.